United States Patent
Kawasaki

(10) Patent No.: US 8,831,364 B2
(45) Date of Patent: Sep. 9, 2014

(54) INFORMATION PROCESSING APPARATUS FOR DETERMINING MATCHING LANGUAGE FOR CHARACTERS IN IMAGE

(71) Applicant: Canon Kabushiki Kaisha, Tokyo (JP)

(72) Inventor: Hiromasa Kawasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 13/757,101

(22) Filed: Feb. 1, 2013

(65) Prior Publication Data

US 2013/0208991 A1     Aug. 15, 2013

(30) Foreign Application Priority Data

Feb. 10, 2012   (JP) ................. 2012-027344

(51) Int. Cl.
G06K 9/72     (2006.01)
G06K 9/68     (2006.01)

(52) U.S. Cl.
CPC ............... G06K 9/72 (2013.01); G06K 9/6842 (2013.01)
USPC ........... 382/229; 382/185; 382/209; 382/778; 358/1.11; 358/462

(58) Field of Classification Search
USPC ......... 382/185, 209, 219, 229, 278; 358/1.11, 358/451, 462
See application file for complete search history.

(56) References Cited

U.S. PATENT DOCUMENTS

| | | | |
|---|---|---|---|
| 7,797,150 B2 * | 9/2010 | Kimura et al. .................... | 704/8 |
| 8,224,641 B2 * | 7/2012 | Goswami .......................... | 704/8 |
| 8,296,168 B2 * | 10/2012 | Subrahmanian et al. .... | 705/7.11 |
| 8,401,841 B2 * | 3/2013 | Roitblat et al. .................. | 704/9 |
| 8,639,708 B2 * | 1/2014 | Van Den Berg et al. ....... | 707/755 |

FOREIGN PATENT DOCUMENTS

JP     H06-150061     5/1994

* cited by examiner

*Primary Examiner* — Yosef Kassa
(74) *Attorney, Agent, or Firm* — Fitzpatrick, Cella, Harper & Scinto

(57) ABSTRACT

An information processing apparatus of the present invention selects one language group, then selects one language from the selected language group, and performs OCR processing appropriate for the selected language on characters included in an image. From an obtained OCR processing result, a matching degree indicating a degree of similarity between the recognized characters in the image and the language selected for the OCR processing is calculated. Then, in a case where the matching degree is equal to or smaller than a particular value, a language belonging to a different language group is selected to further perform OCR processing. The efficiency of the OCR processing is improved. The information processing apparatus of the present invention allows improvement in the efficiency of the OCR processing.

9 Claims, 13 Drawing Sheets

| OCR LANGUAGE GROUP | OCR LANGUAGE |
|---|---|
| CHINESE CHARACTER GROUP | JAPANESE, CHINESE, TAIWANESE, ETC. |
| LATIN GROUP | ENGLISH, GERMAN, FRENCH, ITALIAN, PORTUGUESE, ETC. |
| ARABIC GROUP | ARABIC, PERSIAN, ETC. |
| BAR CODE | 2D BAR CODE, QR CODE, ETC. |

FIG.4

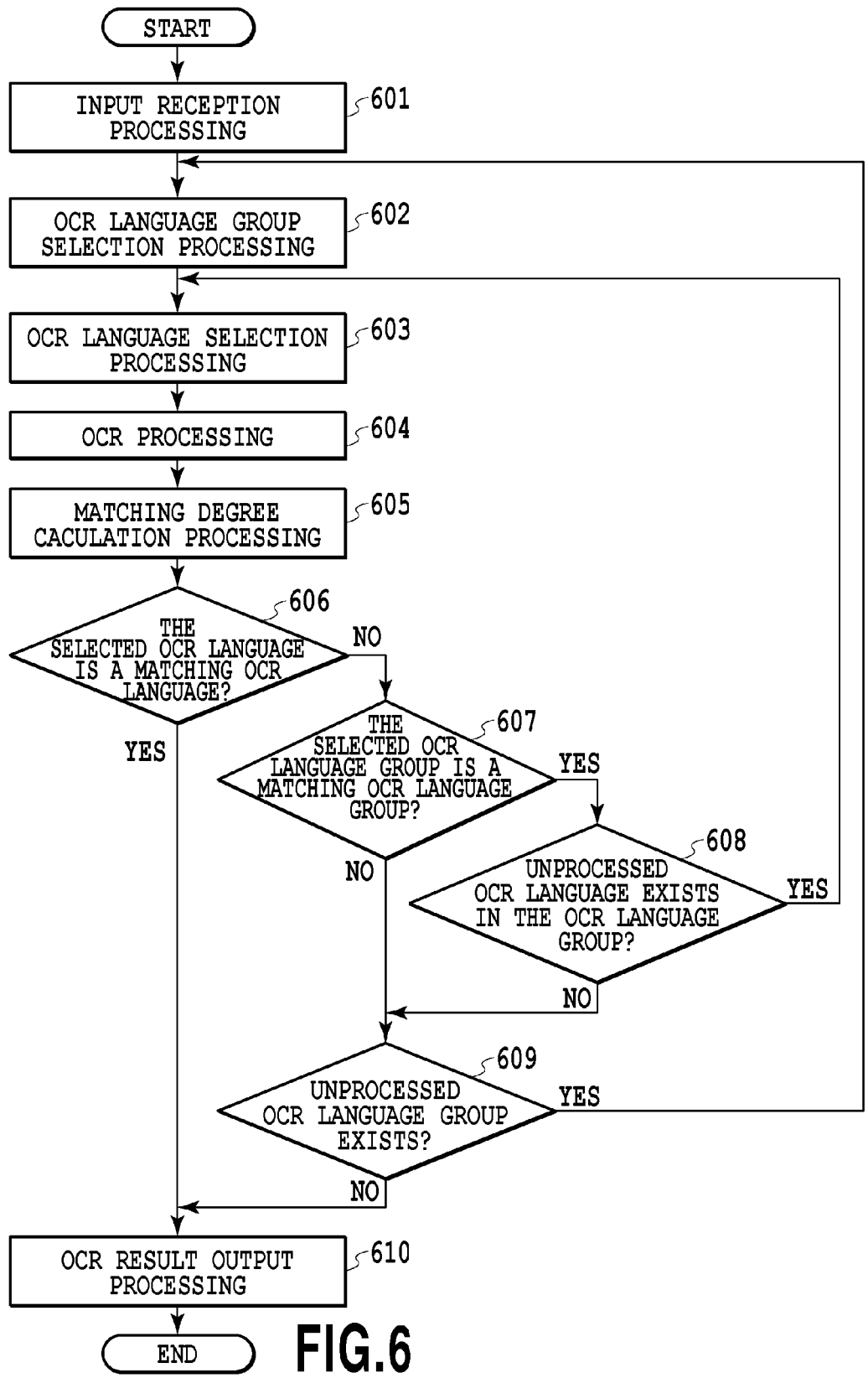

LANGUAGES OCR MODULE 1 CAN PROCESS

| OCR LANGUAGE GROUP | OCR LANGUAGE |
|---|---|
| CHINESE CHARACTER GROUP | JAPANESE |
| CHINESE CHARACTER GROUP | CHINESE |
| CHINESE CHARACTER GROUP | TAIWANESE |
| LATIN GROUP | ENGLISH |

LANGUAGES OCR MODULE 2 CAN PROCESS

| OCR LANGUAGE GROUP | OCR LANGUAGE |
|---|---|
| LATIN GROUP | ENGLISH |
| LATIN GROUP | GERMAN |
| LATIN GROUP | DUTCH |
| ARABIC GROUP | ARABIC |
| ARABIC GROUP | PERSIAN |

LANGUAGES OCR MODULE 3 CAN PROCESS

| OCR LANGUAGE GROUP | OCR LANGUAGE |
|---|---|
| LATIN GROUP | ENGLISH |
| LATIN GROUP | FRENCH |
| LATIN GROUP | GERMANY |
| LATIN GROUP | ITALIAN |
| LATIN GROUP | SPANISH |
| CHINESE CHARACTER GROUP | JAPANESE |

FIG.9

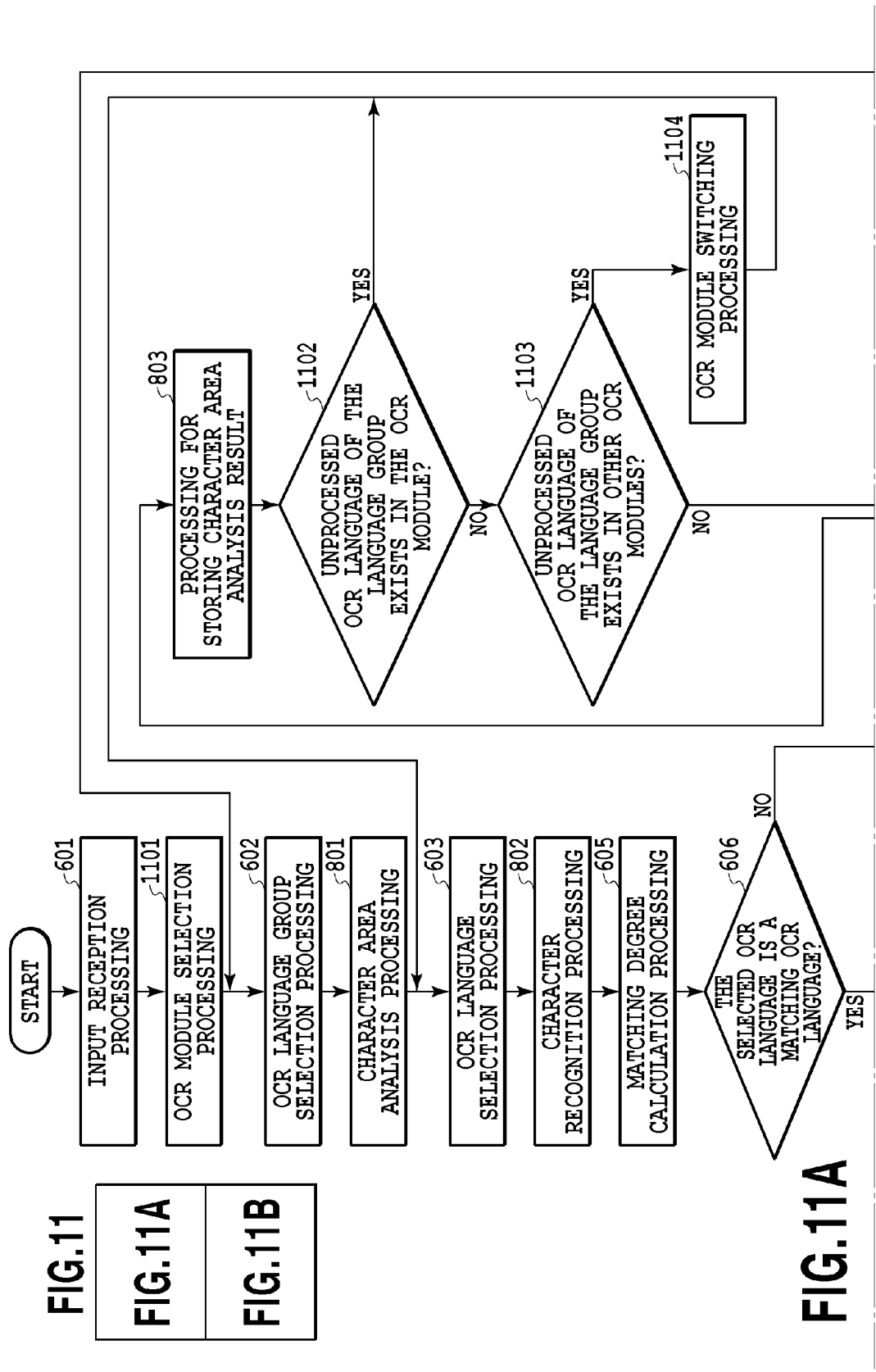

FIG.12

LANGUAGES OCR MODULE 1 CAN PROCESS

| OCR LANGUAGE GROUP | OCR LANGUAGE | PERFORMANCE VALUE |
|---|---|---|
| CHINESE CHARACTER GROUP | JAPANESE | A |
| CHINESE CHARACTER GROUP | CHINESE | B |
| CHINESE CHARACTER GROUP | TAIWANESE | B |
| LATIN GROUP | ENGLISH | C |

LANGUAGES OCR MODULE 2 CAN PROCESS

| OCR LANGUAGE GROUP | OCR LANGUAGE | PERFORMANCE VALUE |
|---|---|---|
| LATIN GROUP | ENGLISH | C |
| LATIN GROUP | GERMAN | C |
| LATIN GROUP | DUTCH | B |
| ARABIC GROUP | ARABIC | B |
| ARABIC GROUP | PERSIAN | B |

LANGUAGES OCR MODULE 3 CAN PROCESS

| OCR LANGUAGE GROUP | OCR LANGUAGE | PERFORMANCE VALUE |
|---|---|---|
| LATIN GROUP | ENGLISH | A |
| LATIN GROUP | GERMAN | B |
| LATIN GROUP | FRENCH | B |
| LATIN GROUP | ITALIAN | B |
| LATIN GROUP | SPANISH | B |
| CHINESE CHARACTER GROUP | JAPANESE | B |

INFORMATION PROCESSING APPARATUS FOR DETERMINING MATCHING LANGUAGE FOR CHARACTERS IN IMAGE

BACKGROUND OF THE INVENTION

1. Field of the Invention

The present invention relates to an information processing apparatus for performing OCR processing in information systems including clouds, web servers, personal computers, original readers, and OCR apparatuses.

2. Description of the Related Art

In optical character recognition (OCR) for recognizing characters included in an image, generally an OCR processing object language is designated by a user to recognize the characters of the designated language in the image.

In a system capable of performing OCR processing based on a plurality of languages, OCR processing is performed based on a particular language, and then a matching degree is calculated from the OCR processing result. In a case where the matching degree is equal to or greater than a predetermined threshold, the particular language is determined to be a matching language. On the other hand, in a case where the matching degree is equal to or smaller than the predetermined threshold, OCR processing is performed based on another language in turn to determine the language having the matching degree equal to or greater than the threshold. For such techniques, see, for example, Japanese Patent Application Laid-open No. H06-150061 (1994).

In a case where OCR processing is performed while languages in OCR processing are changed in turn in accordance with the conventional techniques, processing based on the matching language may become the last processing depending on the order of the languages to be processed, and as a result the OCR processing based on all the languages may be required. Moreover, In a case where no language data is retained for performing the OCR processing based on the language in the image, the OCR processing may be performed based on every language before it is determined that the language in the image is out of recognition. Thus, one existing problem was the low processing efficiency when the OCR processing involves changing languages one by one in a predetermined order.

SUMMARY OF THE INVENTION

The present invention has been made to solve the above problems, and an information processing apparatus of the present invention includes:

an input unit configured to input an image;

a first selection unit configured to select one language group from a plurality of language groups, wherein a plurality of languages are classified into the plurality of language groups;

a second selection unit configured to select one language belonging to the language group selected by the first selection unit;

a character recognition unit configured to perform character recognition appropriate for the language selected by the second selection unit on characters included in the image inputted by the input unit to obtain a character recognition result;

a calculation unit configured to calculate a matching degree indicating a degree of similarity between the characters in the image on which the character recognition was performed and the language selected by the second selection unit based on the character recognition result by the character recognition unit; and a control unit configured to, in a case where the calculated matching degree is equal to or greater than a first threshold, determine that the characters in the image on which the character recognition was performed are of the language selected by the second selection unit, and output the character recognition result, in a case where the calculated matching degree is equal to or greater than a second threshold and smaller than the first threshold, cause the second selection unit to select a new language from other languages belonging to the selected language group and cause the character recognition unit to perform character recognition based on the selected new language, and in a case where the calculated matching degree is smaller than the second threshold, cause the first selection unit to select a new language group that is different from the selected language group, cause the second selection unit to select a new language from languages belonging to the selected new language group, and cause the character recognition unit to perform character recognition based on the selected new language.

The information processing apparatus of the present invention can improve the processing efficiency in performing OCR processing based on multiple languages.

Further features of the present invention will become apparent from the following description of exemplary embodiments (with reference to the attached drawings).

BRIEF DESCRIPTION OF THE DRAWINGS

FIG. 4 shows an exemplary classification of OCR languages into OCR language groups;

FIG. 6 is a flow chart showing an OCR procedure in accordance with the first embodiment;

FIG. 9 shows exemplary OCR modules in accordance with a second embodiment;

FIG. 11 is a diagram showing the relationship of FIGS. 11A and 11B;

FIG. 11A is a flow chart showing an OCR procedure in accordance with the second embodiment;

FIG. 12 illustrates OCR modules in which performance values are associated.

DESCRIPTION OF THE EMBODIMENTS

In the following, embodiments of the present invention will be explained with reference to the attached drawings.

First Embodiment

In a first embodiment, OCR processing of the present invention is performed in an OCR system, particularly in a client PC. The OCR processing of the present invention can be performed not only in a client PC, but also in web services on servers or cloud computing. Further, the present invention can also be performed in an original reader such as a scanner and a multifunction peripheral. OCR systems include systems giving weight to recognition rates and systems giving weight to high processing speed. The present invention is particularly directed to the system giving weight to high processing speed.

Figure 1:
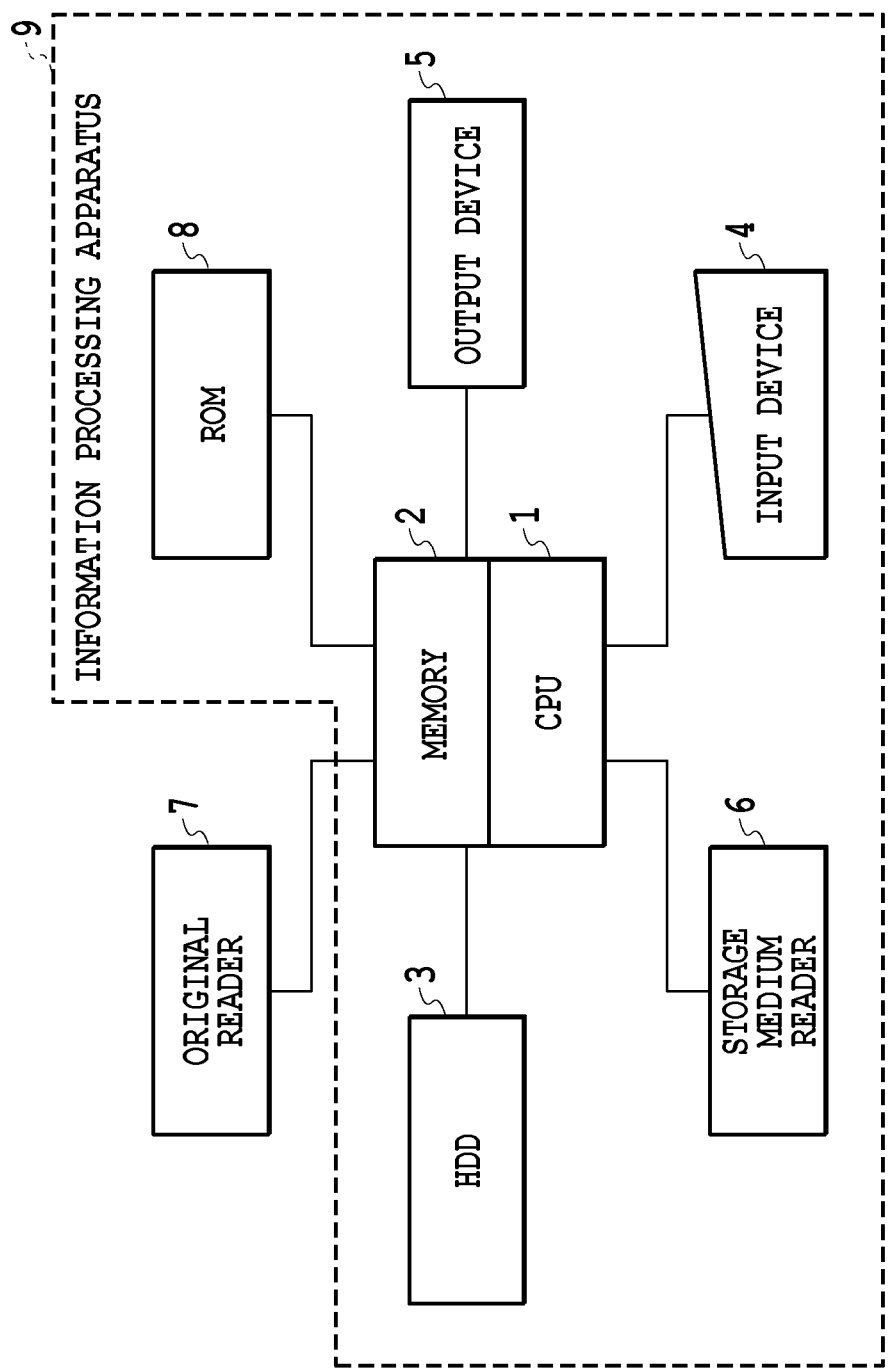
FIG. 1 is a block diagram showing an exemplary configuration of an information processing apparatus in accordance with a first embodiment.

FIG. 1 is a block diagram showing an exemplary configuration of an information processing apparatus of the present invention for performing OCR processing.

In FIG. 1, an information processing apparatus 9 includes: a CPU 1 for data processing and controlling each unit in the information processing apparatus 9; memory 2 for retaining data read/written by the CPU; an HDD (hard disc drive) 3 for storing various data; an input device 4, such as a keyboard and a pointing device, for receiving input from a user; an output device 5, such as a display, for outputting data based on instructions from the CPU 1; a storage medium reader 6 for reading data from a storage medium such as an FD, a CD-ROM, and a memory card; and an original reader 7, such as a scanner and a multifunction peripheral, for storing read images in, for example, the HDD 3. The HDD 3 may be an HDD or a combination of more than one HDD. It should be understood that devices connected via a network would not limit the scope of the present invention.

Figure 2:
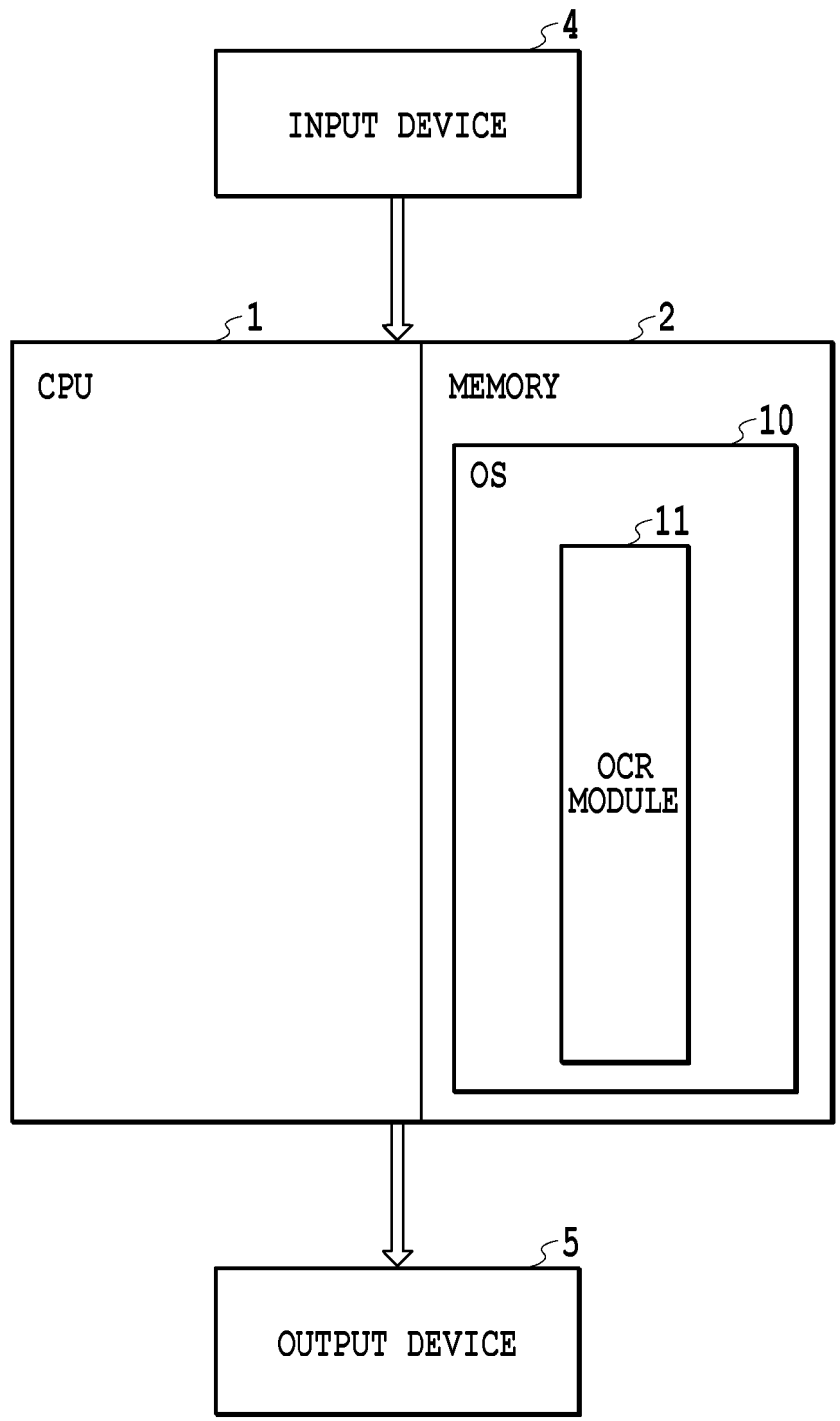
FIG. 2 illustrates a concept of input and output in OCR processing.

FIG. 2 illustrates a concept of the procedure from receiving an OCR instruction to perform OCR processing, implementing an OCR module (OCR program) by the CPU 1 for performing OCR processing, to outputting a processing result. The CPU 1 loads an OS program, an OCR program, and other application programs from the HDD 3 (or other storage media via the storage medium reader 6) into the memory 2. When the input device 4 inputs an OCR instruction, the CPU 1 executes the processing based on an OCR module 11. The CPU 1 causes the HDD 3 to store a processing result of the processing performed according to the OCR module 11 and outputs the processing result to the output device 5. The OCR module 11 operates under the control of an OS program 10.

Figure 3:
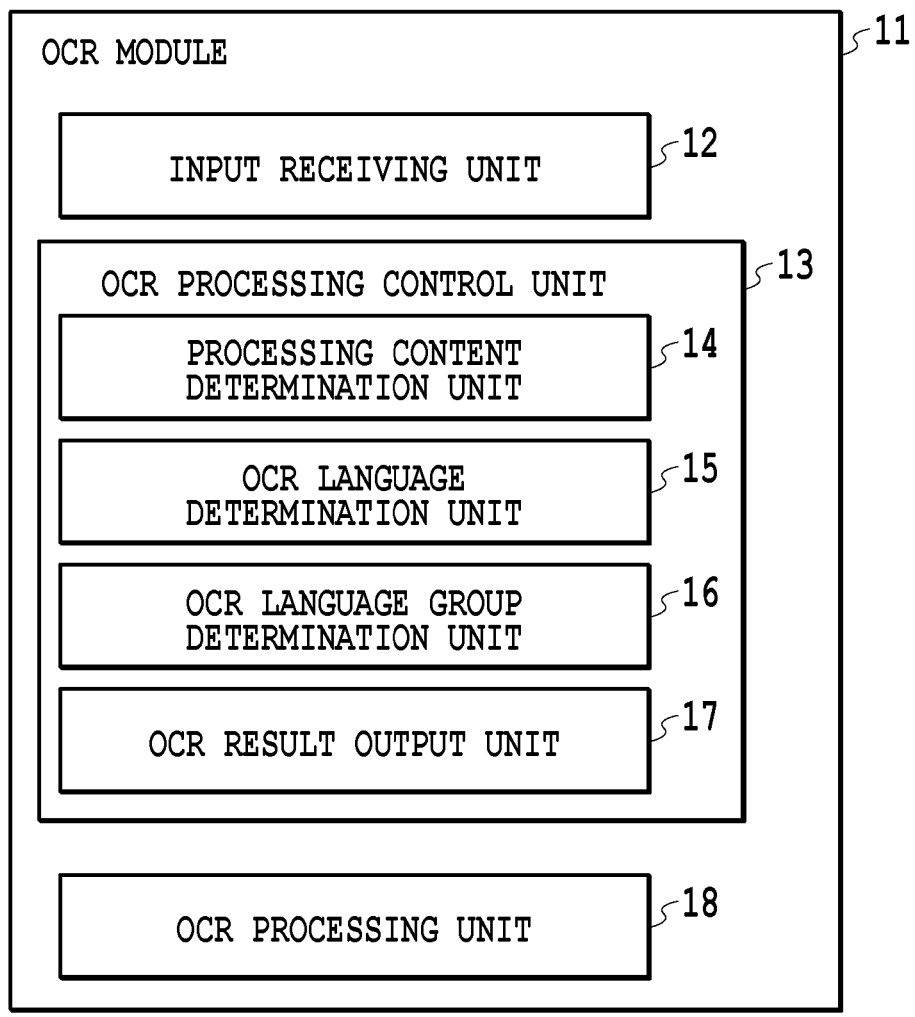
FIG. 3 is a block diagram showing an exemplary configuration of an OCR module.

The CPU 1 (computer) implements the OCR module (OCR program) to function as each processing unit shown in the block diagram of FIG. 3.

The OCR module 11 includes an input receiving unit 12 for receiving input of an image for OCR processing. The OCR module 11 includes an OCR processing control unit for controlling each unit associated with the OCR processing.

The OCR processing control unit 13 includes a processing content determination unit 14, an OCR language determination unit 15, an OCR language group determination unit 16, and an OCR result output unit 17. The processing content determination unit 14 selects an OCR language group which includes OCR languages to be processed in an OCR processing unit 18, as well as an OCR language.

The OCR processing unit 18 calculates a matching degree using the selected OCR language. The matching degree indicates a degree of similarity between characters in an image recognized by the OCR processing and the selected OCR language. The matching degree will be described later with reference to FIG. 5.

The OCR language determination unit 15 determines whether the characters in the image are of the selected OCR language based on the matching degree.

The OCR language group determination unit 16 determines whether the language in the image is within the OCR language group to which the selected OCR language belongs.

The OCR result output unit 17 outputs recognized character strings as an OCR result, into a document file such as a text file.

Next, the OCR language groups, the feature of the present invention, will be described with reference to FIG. 4. The OCR languages can be classified into OCR language groups according to similarities among languages. For instance, Chinese, Taiwanese, and Japanese languages can be classified into one OCR language group (Chinese character language group). Further, English, German, and French languages can be classified into one OCR language group (Latin language group). The OCR languages are classified into OCR language groups such that when the OCR processing is performed on a particular image including characters, each OCR language group consists of OCR languages having similar matching degrees.

For example, in performing OCR processing on an image including the Japanese language by using the English or French language, it is most likely that a matching degree indicates 0%. On the other hand, in performing OCR processing on an image including the Japanese language by using the Chinese or Taiwanese language which belongs to the same language group as the Japanese language, a matching degree may be several tens of % due to the recognition capability for portions including Chinese characters. Accordingly, a higher matching degree may be obtained between similar languages. On the other hand, in performing OCR processing by using an OCR language which belongs to a different OCR language group, a matching degree may be close to 0%. In performing OCR processing by using a different OCR language belonging to the same OCR language group, a matching degree may be smaller than that obtained by the OCR processing using the language included in the image. However, the matching degree may be greater than that obtained by the OCR processing using the OCR language belonging to an OCR language group different from the OCR language group to which the language included in the image belongs. The present invention utilizes the feature that similar matching degrees are obtained between similar languages in performing OCR processing on a particular image. This will be described later in detail with reference to FIGS. 7A and 7B.

Next, the processing by the OCR processing unit 18 will be described in detail with reference to FIG. 5.

The OCR processing unit 18 inputs an input image and an OCR language to be used in OCR processing. Then, the OCR processing unit 18 performs the OCR processing using the inputted OCR language, and outputs characters recognized based on the OCR language and a matching degree as an OCR processing result.

Particularly, the OCR processing unit 18 performs the following processing in this order: character area analysis processing (501), character recognition processing (502), and matching degree calculation processing (503).

First, in the character area analysis processing (501), a character area in the input image is specified.

Next, in the character recognition processing (502), character recognition processing appropriate for the designated OCR language is performed on the character area specified in the character area analysis processing (501) to recognize characters. Then, the recognized characters are written into a text file or the like. The text file may be a document file, such as a PDF file or a Word file, into which character information is embedded.

Next, the matching degree calculation processing (503) is performed. A matching degree represents a degree of concordance between the characters included in the input image and the OCR language applied. Note that the matching degree can be calculated by obtaining a degree of concordance with a character shape dictionary retained by the OCR processing unit based on the shape of the characters in the image or by obtaining a degree of concordance between the text in the recognition result and a word dictionary retained by the OCR processing unit 18. Incidentally, the matching degree is expressed as a percentage in this embodiment.

Next, a procedure in accordance with the information processing of the present invention will be described with reference to FIG. 6.

First, an input receiving unit 12 acquires an input image (S601).

Next, the processing content determination unit 14 performs OCR language group selection processing (S602). In the OCR language group selection processing (S602), one OCR language group is selected as a first selection based on a predetermined priority of OCR language groups. The priority will be described with reference to FIGS. 7A and 7B.

Then, the processing content determination unit performs OCR language selection processing (S603) to select an OCR language belonging to the OCR language group selected in S602 as a second selection. Here, the OCR language is selected based on a predetermined priority of OCR languages. The priority will be described with reference to FIGS. 7A and 7B.

The OCR processing unit 18 performs OCR processing on the input image using a recognition algorithm and a recognition dictionary appropriate for the selected OCR language (S604). These processes correspond to the character area analysis processing (501) and character recognition processing (502) as shown in FIG. 5.

Then, the OCR processing unit 18 calculates a matching degree based on the result of the character recognition processing (S605). This process corresponds to the matching degree calculation processing (503) shown in FIG. 5.

Next, the OCR language determination unit 15 determines whether the matching degree is equal to or greater than a first threshold to determine whether the characters included in the input image match the currently selected OCR language (S606). The determination step will be described later in detail with reference to FIGS. 7A and 7B.

In a case where the currently selected OCR language is determined to be a matching language for the characters included in the input image (S606: YES), the OCR result output unit 17 performs OCR processing by using the currently selected OCR language and outputs the processing result (S610).

In a case where the currently selected OCR language is determined not to be a matching language for the characters included in the input image (S606: NO), the OCR language group determination unit 16 determines whether the matching degree is equal to or greater than a second threshold. Then, the OCR language group determination unit determines whether there is a possibility that the characters included in the input image belong to the selected OCR language group (S607). The determination step will be described later in detail with reference to FIGS. 7A and 7B. In a case where it is determined that the characters belong to the selected language group (S607: YES), the OCR language group determination unit 16 determines whether there exists any unprocessed OCR language belonging to the currently selected OCR language group (S608).

In a case where there exists an unprocessed OCR language belonging to the currently selected OCR language group (S608: YES), the processing returns to the OCR language selection processing (S603). In a case where there exists no unprocessed OCR language in the currently selected OCR language group (S608: NO), the OCR language group determination unit 16 determines whether there exists any unprocessed OCR language group (S609). Further in S607, In a case where it is determined that there is no possibility that the characters included in the input image belong to the selected OCR language group (S607: NO), the OCR language group determination unit 16 determines whether there exists any unprocessed OCR language group (S609).

In S609, in a case where it is determined that there exists an unprocessed OCR language group, the processing returns to the OCR language group selection processing (S602).

In S609, in a case where it is determined that there exists no unprocessed OCR language group, OCR result output processing (S610) is performed. Here, the processing may be completed as an error or the OCR processing result having a maximum matching degree may be outputted.

Next, with reference to FIG. 7A, matching degree, OCR languages, OCR language groups, and priorities will be described. In this embodiment, two thresholds are used for determining OCR languages and OCR language groups.

Figure 7A:
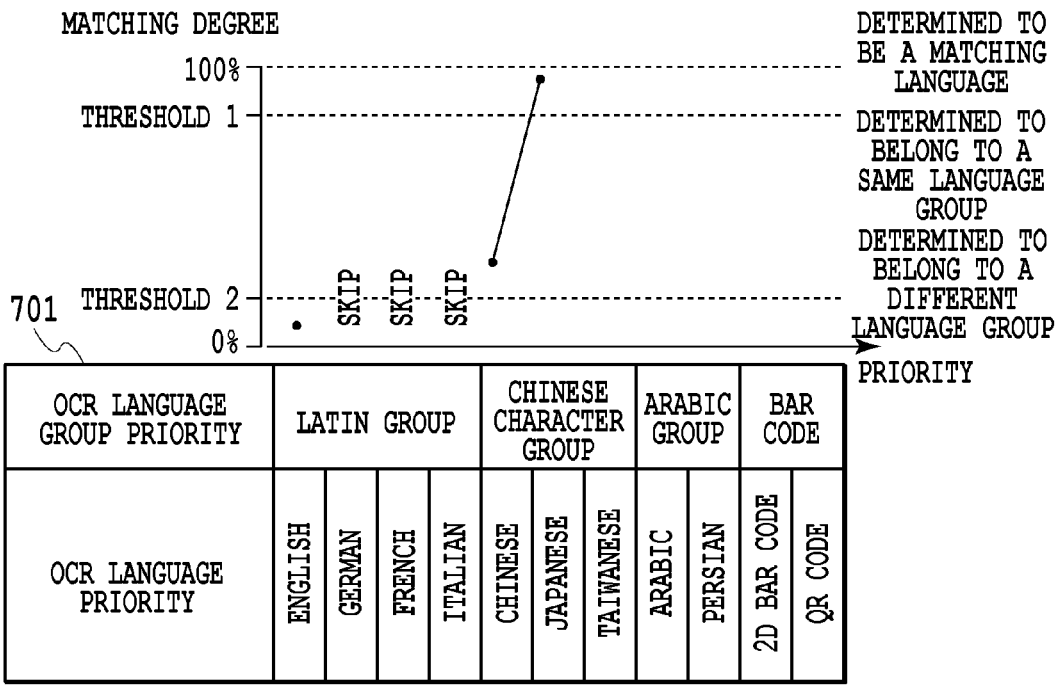
FIG. 7A illustrates OCR language groups and OCR languages.
Figure 7B:
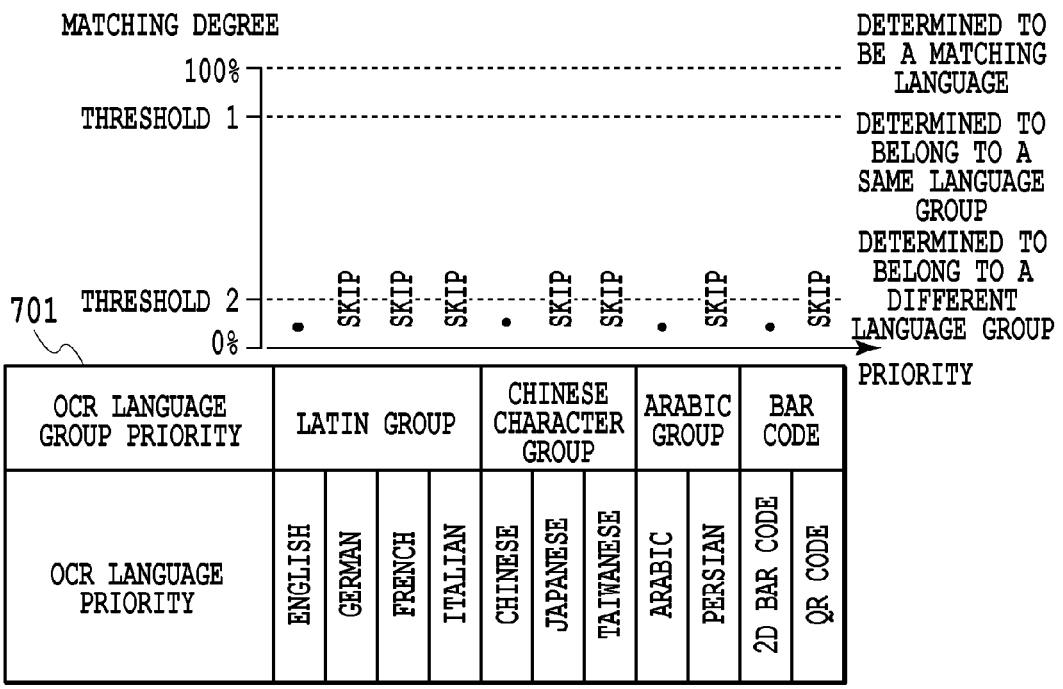
FIG. 7B illustrates OCR language groups and OCR languages.

As shown in FIGS. 7A and 7B, a threshold 1, or a first threshold, and a threshold 2, or a second threshold, are used for determining whether a selected OCR language is a matching language for the characters included in the input image. The threshold 2 is set to be smaller than the threshold 1. For instance, the threshold 1 is set to 90% and the threshold 2 is set to 10%.

Next, priorities used for selecting OCR languages and OCR language groups will be described. Note that in the OCR language group selection processing (S602) and the OCR language selection processing (S603), OCR language groups and OCR languages are selected based on priorities.

An exemplary setting of priorities will be described with reference to FIG. 7A. As represented by a reference numeral 701, OCR language groups are ranked in the order of highest to lowest priority: Latin group, Chinese character group, Arabic group, and bar code. Further in the Latin OCR language group, OCR languages are ranked in the order of highest to lowest priority: English, German, French, and Italian.

Similarly, priorities are set to OCR languages in the other OCR language groups including Chinese character group, Arabic group, and bar code.

The priorities of OCR language groups and the priorities of OCR languages are set by using predetermined values. Further, in a case where image analysis is performed after the input receiving processing (S601) in the present embodiment, priorities may be set according to an edge analysis result and an image density analysis result of an input image, which indicate a specific image feature amount for each language group and each language.

In an example shown in FIG. 7A, first, the OCR processing is performed based on English, which has the highest priority among the OCR languages in the Latin group having the highest priority among the OCR language groups, and then a matching degree is obtained. In a case where the matching degree obtained by the OCR processing based on English is smaller than the threshold 2, it is determined that the recognized characters belong to a different language group, thereby omitting OCR processing based on German, French, and Italian.

Next, the OCR processing is performed based on Chinese, which has the highest priority among the OCR languages in the Chinese character group having the second highest priority among the OCR language groups, and then a matching degree is obtained. In a case where, as a result of the OCR processing based on Chinese, the matching degree is equal to or greater than the threshold 2 (equal to or greater than the second threshold) and smaller than the threshold 1, the OCR processing is further performed based on another OCR language in the Chinese character group. That is, the OCR processing is performed based on Japanese, which has the second highest priority among the OCR languages in the Chinese character group. In a case where, as a result, the matching degree is equal to or greater than the threshold 1 (equal to or greater than the first threshold), an OCR processing result based on Japanese is outputted and the processing is completed.

As shown in FIG. 7B, even if no matching language is found, it is not necessary to apply all languages in OCR. A matching degree may be obtained only for the language having the highest OCR language priority in each OCR language group. Accordingly, OCR processing is performed according to the number of OCR language groups. In an example shown in FIG. 7B, the OCR processing is performed only four times.

As described above, an OCR language group is selected according to the priority. In the selected OCR language group, an OCR language is selected according to the priority, and the OCR processing is performed based on the selected OCR language. In a case where an obtained matching degree is equal to or greater than the threshold 2, an OCR language group having a priority lower than that of the selected language group is newly selected. Then, an OCR language belonging to the newly selected OCR language group and having the highest priority is selected, and the OCR processing is performed.

In this embodiment, all OCR languages are set to have the same value for each threshold 1 and threshold 2. However, a different threshold may be used for each OCR language in consideration of tendencies in similarities among OCR languages within the OCR language group or differences in OCR processing precision among languages.

Figure 5:
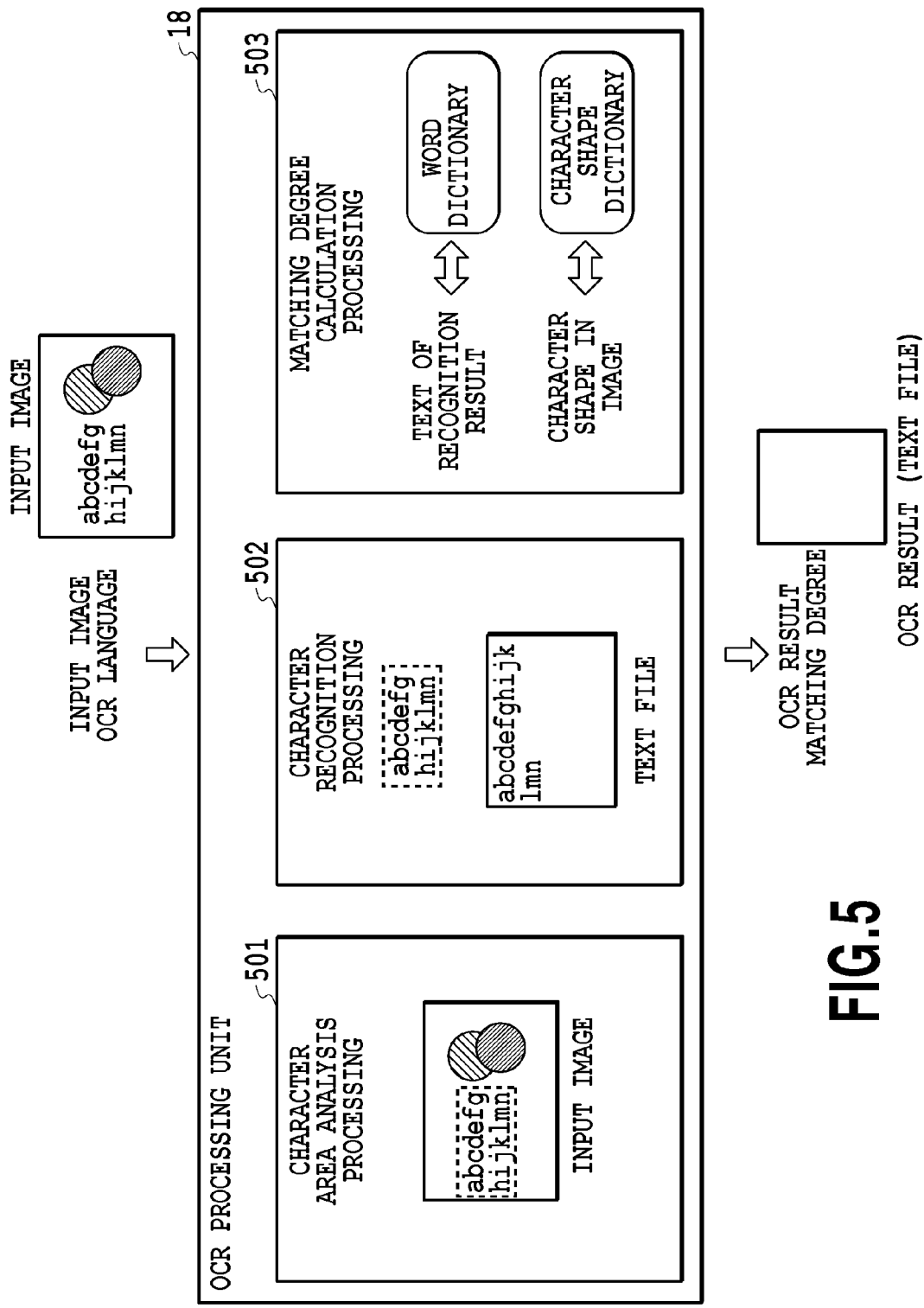
FIG. 5 illustrates processing by an OCR processing unit.

Incidentally, as shown in FIG. 5, the OCR processing is performed by the step of character area analysis for specifying a character area in an image (501) and the step of character recognition for determining characters in the specified image (502). Since languages in the same OCR language group have similar character shapes, it is possible to reuse the character area analysis (501).

Figure 8:
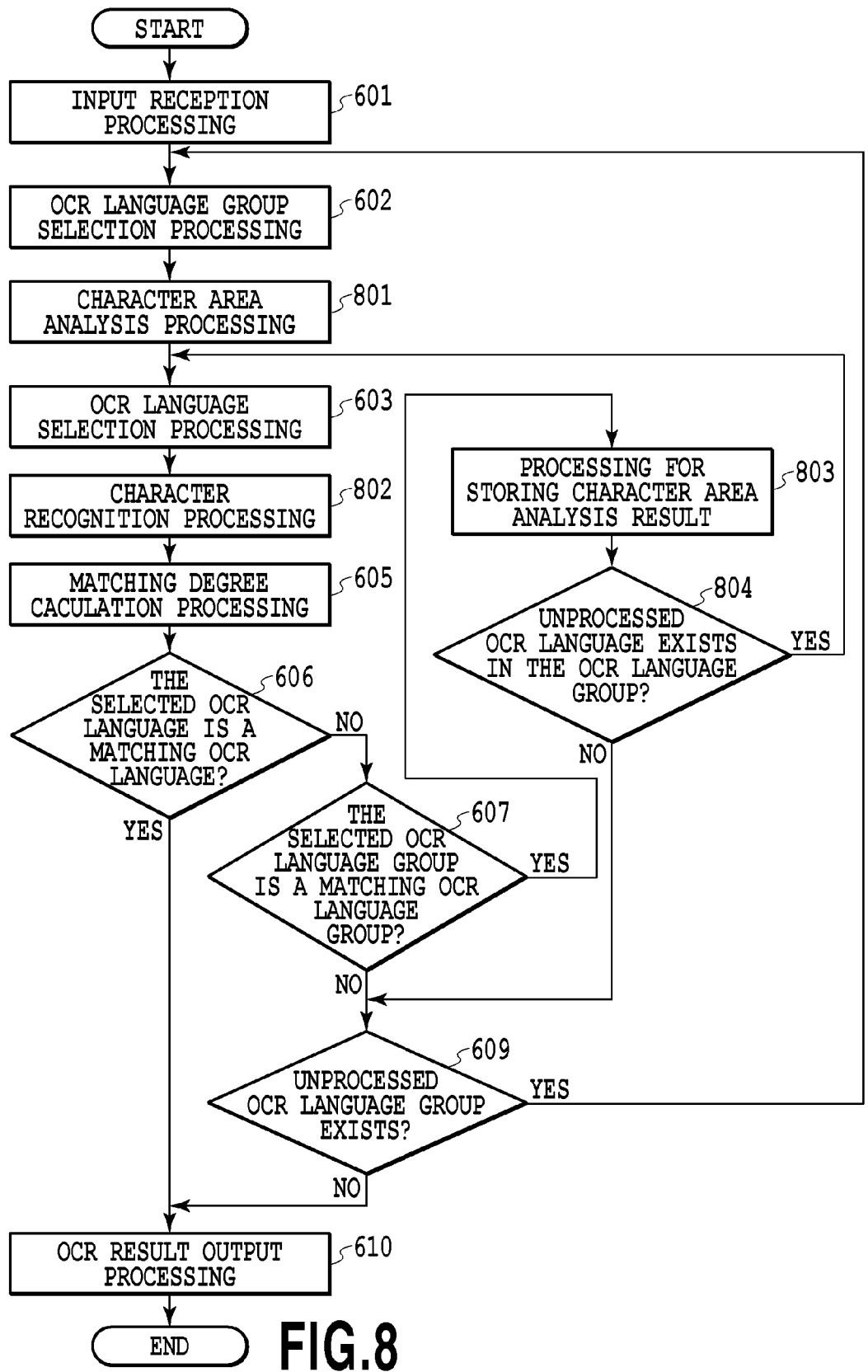
FIG. 8 is a flow chart showing a procedure for reusing character area recognition.

In a case where the character area recognition and the character recognition of an OCR module are independently performed, the processing efficiency becomes low unless a character area analysis result is reused in the same language group. FIG. 8 is a flow chart showing the processing of reusing this character area analysis. Processing that is different from FIG. 5 will be described below.

In the processing reusing the character area analysis, the OCR processing shown in FIG. 5 is divided into character area analysis processing (S801) and character recognition processing (S802). The processing content determination unit 14 performs the OCR language group selection processing (S602) before the OCR processing unit 18 performs the character area analysis processing (S801).

Next, the processing content determination unit 14 performs the OCR language selection processing (S603) before the OCR processing unit 18 performs the character recognition processing (S604). In the OCR language group determination unit 16, in a case where it is determined that there is a possibility that the characters in the image are characters belonging to a different OCR language in the selected OCR language group (S607: YES), a character area analysis result is stored (S803). In a case where it is determined that an unprocessed OCR language exists in the OCR language group (S804), the processing returns to the OCR language selection processing after the area analysis processing, and the stored character area analysis result is used. This allows the reuse of character area analysis processing in the same group, thereby reducing processing time.

Second Embodiment

There may be a need for performing OCR processing based on multiple languages by using one OCR module from a plurality of OCR modules capable of performing OCR processing based on multiple languages. In such a case, if the processing in accordance with the first embodiment is performed without consideration of OCR languages associated with the same OCR module, the same OCR module may be activated multiple times. In this case, the OCR module is loaded and initialized many times, causing an increase in processing time and low efficiency.

An exemplary OCR module will be described below with reference to FIG. 9. An OCR module 2 performs OCR processing based on English, then an OCR module 3 performs OCR processing based on German, and then the OCR module 2 performs OCR processing based on French. In this case, the OCR module 2 is loaded and initialized two times. Loading the same module multiple times in this manner is inefficient.

In this embodiment, OCR module switching determination is made such that switching is required as less as possible to achieve a high-speed processing.

In a case where it is determined that a matching language for the characters included in the input image is a different OCR language belonging to the same OCR language group based on the calculation of a matching degree by OCR processing and the determination using thresholds, the different OCR language in the same OCR language group in the same OCR module is preferentially selected. Further, in a case where it is determined that a matching language for the characters included in the input image belongs to a different language group, the different OCR language group in the same OCR module is preferentially selected. In this manner, the OCR language group and the OCR language in the same OCR module are preferentially selected, thereby reducing the frequency of switching between modules and allowing proper OCR language selection with good efficiency.

The basic system configuration is identical with the one in the first embodiment. Differences between the first embodiment and this embodiment will be described hereinafter.

Figure 10:
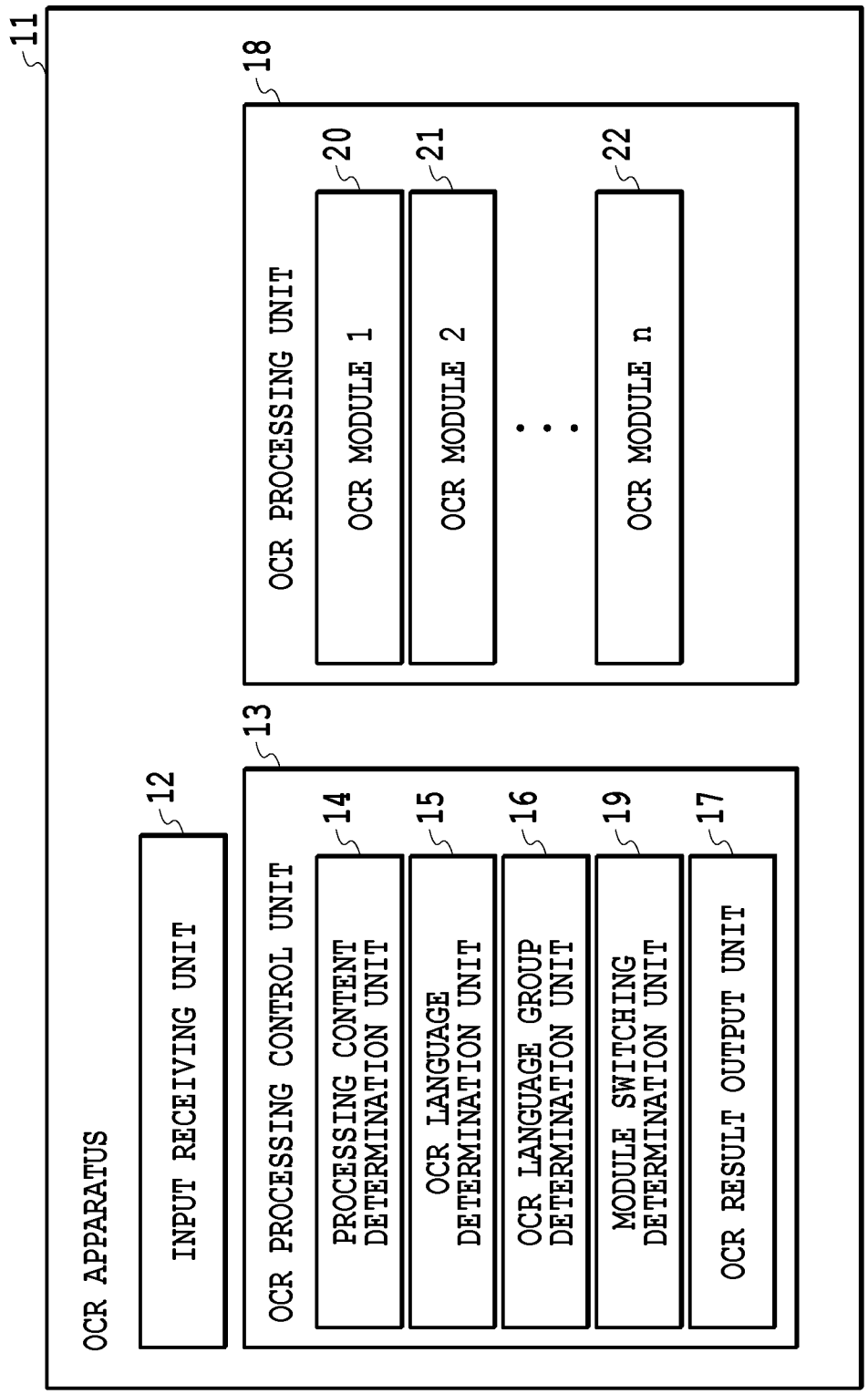
FIG. 10 is a block diagram showing an exemplary configuration of the information processing apparatus in accordance with the second embodiment.

In FIG. 10, the information processing apparatus of FIG. 3 further includes a plurality of OCR modules in the OCR processing unit 18 (e.g., modules 20 to 22). A module switching determination unit 19 determines switching between modules.

Figure 11B:
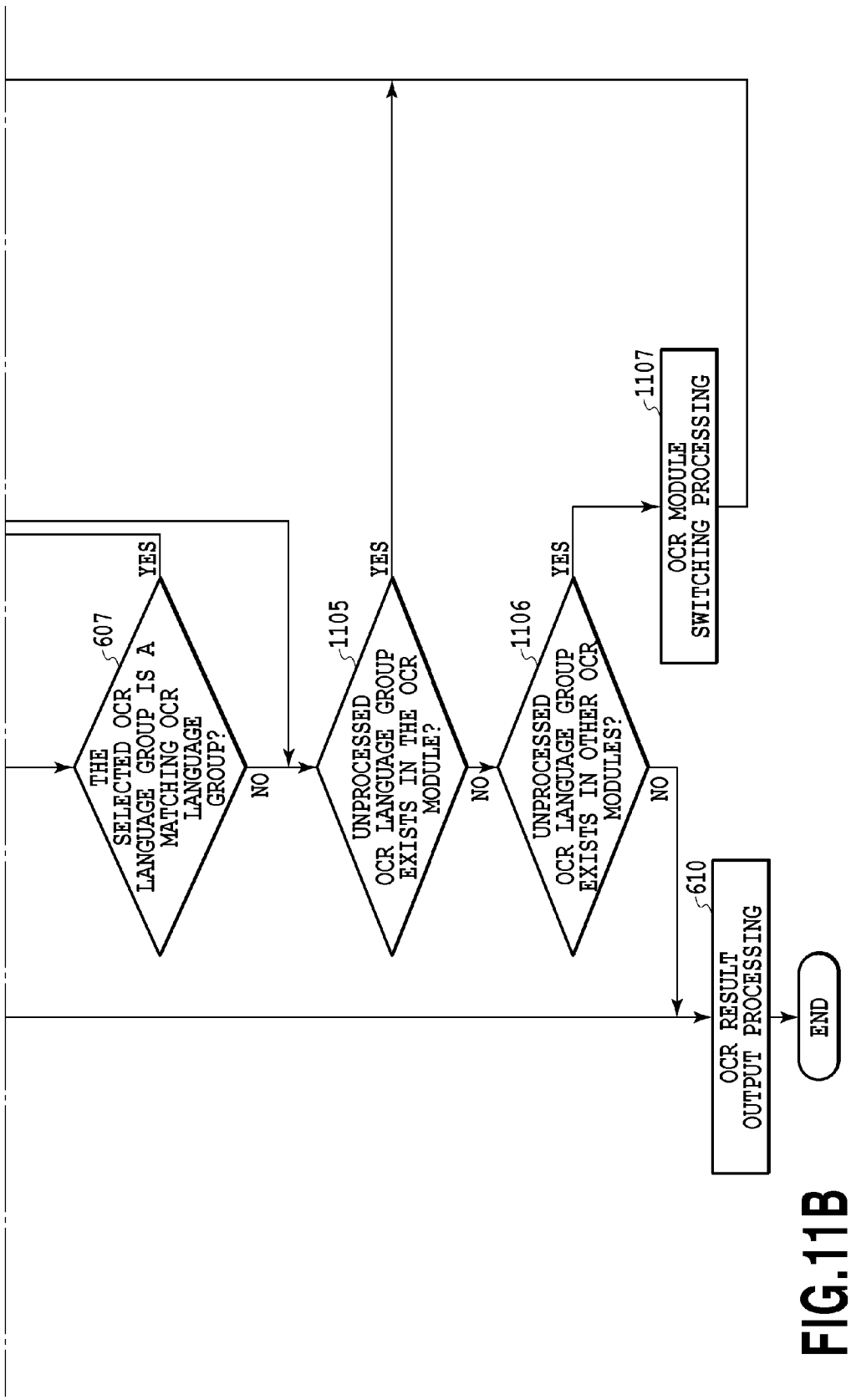
FIG. 11B is a flow chart showing an OCR procedure in accordance with the second embodiment.

FIGS. 11A and 11B are a flow chart showing an exemplary procedure for information processing in accordance with the second embodiment. In FIGS. 11A and 11B, module switching processing is added to the flow chart of FIG. 8. The flow chart of FIGS. 11A and 11B illustrates the case of reusing character area analysis in the OCR language group. In a case where the character area analysis processing (S801) and the character recognition processing (S802) cannot be performed separately for the OCR processing, the character area analysis is not performed in S801, but the character area analysis and the character recognition processing are performed in the character recognition processing (S802).

Differences between the flow chart of FIGS. 11A and 11B and the flow chart of FIG. 8 will be described below.

After the input receiving unit 12 acquires an input image (S601), the processing content determination unit 14 performs OCR module selection processing (S1101). In the OCR module selection processing (S1101), an OCR module is selected based on a predetermined priority of OCR modules. The priority of OCR modules will be described later.

In the OCR language group determination unit 16, in a case where it is determined that the characters belong to the selected OCR language group (S607), processing for storing a character area analysis result (S803) is performed.

Next, the OCR language group determination unit 16 determines whether any unprocessed OCR language in the currently selected OCR language group exists in the currently selected OCR module (S1102).

In a case where an unprocessed OCR language exists in the currently selected OCR module, the module switching determination unit 19 does not switch the OCR module, and the processing returns to the OCR language selection processing (S603).

In a case where no unprocessed OCR language exists in the currently selected OCR module (S1102: NO), the module switching determination unit 19 determines whether any unprocessed OCR language in the currently selected OCR language group exits in other modules (S1103).

In a case where an unprocessed OCR language exists in other modules (S1103: YES), the module switching determination unit 19 switches to a module which includes an unprocessed OCR language in the currently selected OCR language group (S1104), and the processing returns to the OCR language selection processing (S603).

In module switching processing (S1104), in a case where more than one module includes an unprocessed OCR language in the currently selected OCR language group, an OCR module is selected based on the priority. In a case where no unprocessed OCR language of the selected OCR language group exists in other modules, the processing moves to S1105. In a case where it is determined that the characters do not belong to the selected OCR language group in S607, the module switching determination unit 19 determines whether any unprocessed language group exists in the selected module (S1105). In a case where an unprocessed language group exists in the selected module, the module switching determination unit 19 does not switch the module, and the processing returns to the OCR language group selection processing (S602). In a case where no unprocessed language group exists in the currently selected module, it is determined whether any unprocessed language group exists in other modules (S1106). In a case where an unprocessed language group exists in the other module, the module switching determination unit 19 switches to the module which includes the unprocessed language group (S1107), and the processing returns to the OCR language group selection processing (S602). In a case where more than one module includes an unprocessed language group, an OCR module is selected based on the priority in the module switching processing (S1107). In a case where no unprocessed language group exists in the other module, it is determined that the OCR has been performed based on all OCR language groups, and no matching language has been found for the characters in the image. Then, the processing moves to the OCR result output processing (S610). The processing may be completed as an error or the OCR processing result having a maximum matching degree may be outputted.

Next, the priority of the OCR modules will be described with reference to FIG. 12. As shown in FIG. 12, performance values, which are obtained by experiments conducted in advance, are associated with OCR languages that are grouped into OCR modules. The performance values represent OCR processing performance for each language in each OCR module, and can be relatively set based on matching degrees obtained by the OCR processing performed on standard data.

For example, a performance value is set for each OCR language by three stages: A, B, and C in the order of higher matching degree. High priorities are given to OCR modules which include languages in the OCR language group having the highest priority. Among the OCR modules which are given high priorities, a higher priority is given to an OCR module which includes an OCR language having a higher performance value in the OCR language group having the highest priority.

For example, in a case where a Latin language group is the OCR language group having the highest priority, it is determined that the highest priority is given to the OCR module 3 which includes the highest performance value A in the Latin group.

Next, the second highest priority is given to the OCR module 2 which includes the second highest performance value B, and the third highest priority is given to the OCR module 3. In this manner, a module having a higher performance value is selected, and accordingly an OCR result having higher performance can be efficiently obtained. The priorities are used when multiple options are set in the OCR module selection processing (S1101) and the OCR module switching processing (S1104) (S1107).

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-027344, filed on Feb. 10, 2012, which is hereby incorporated by reference herein in its entirety.

What is claimed is:

1. An information processing apparatus, comprising:
an input unit configured to input an image;
a first selection unit configured to select one language group from a plurality of language groups, wherein a plurality of languages are classified into the plurality of language groups;
a second selection unit configured to select one language belonging to the language group selected by the first selection unit;

a character recognition unit configured to perform character recognition appropriate for the language selected by the second selection unit on characters included in the image inputted by the input unit to obtain a character recognition result;

a calculation unit configured to, based on the character recognition result obtained by the character recognition unit, calculate a matching degree indicating a degree of similarity between the characters in the image on which the character recognition was performed and the language selected by the second selection unit; and a control unit configure to, in a case where the calculated matching degree is equal to or greater than a first threshold, determine that the characters in the image on which the character recognition was performed are of the language selected by the second selection unit, and output the character recognition result, in a case where the calculated matching degree is equal to or greater than a second threshold and smaller than the first threshold, cause the second selection unit to select a new language from other languages belonging to the selected language group and cause the character recognition unit to perform character recognition based on said selected new language, and in a case where the calculated matching degree is smaller than the second threshold, cause the first selection unit to select a new language group that is different from the selected language group, cause the second selection unit to select a new language from languages belonging to the selected new language group, and cause the character recognition unit to perform character recognition based on said selected new language.

2. The information processing apparatus according to claim 1, wherein the first selection unit is configured to select a language group based on a priority associated with each language group.

3. The information processing apparatus according to claim 1, wherein the second selection unit is configured to select a language based on a priority associated with each language belonging to a same language group.

4. An information processing apparatus having a plurality of modules for recognizing characters included in an image, comprising:

an input unit configured to input an image;

a first selection unit configured to select one module;

a second selection unit configured to select one language included in the module selected by the first selection unit;

a character recognition unit configured to perform character recognition appropriate for the language selected by the second selection unit on characters included in the image inputted by the input unit to obtain a character recognition result;

a calculation unit configured to, based on the character recognition result obtained by the character recognition unit, calculate a matching degree indicating a degree of similarity between the characters in the image on which the character recognition was performed and the language selected by the second selection unit; and a control unit configured to, in a case where the calculated matching degree is equal to or greater than a first threshold, determine that a matching language for the characters in the image on which the character recognition was performed is the language selected by the second selection unit, and outputting the character recognition result, in a case where the calculated matching degree is equal to or greater than a second threshold and smaller than the first threshold, cause the second selection unit to select a new language from other languages included in the selected module and causing the character recognition unit to perform character recognition in accordance with said selected new language, and in a case where the calculated matching degree is smaller than the second threshold, cause the first selection unit to select a new module, cause the second selection unit to select a new language from languages included in the selected new module, and cause the character recognition unit to perform character recognition based on said selected new language.

5. The information processing apparatus according to claim 4, wherein the first selection unit is configured to select a module based on a priority associated with each module.

6. The information processing apparatus according to claim 4, wherein the second selection unit is configured to select a language based on a priority associated with each language included in a same module.

7. The information processing apparatus according to claim 6, wherein the priority associated with each language included in a same module is based on precision in the character recognition.

8. A program for causing a computer to function as each unit of the information processing apparatus according to claim 1.

9. A non-transitory computer-readable storage medium that stores the program according to claim 8.

* * * * *